April 2, 1935.　　　　　　　G. C. CHASE　　　　　1,996,144
TRANSMISSION MECHANISM
Filed Jan. 17, 1934　　　3 Sheets-Sheet 1
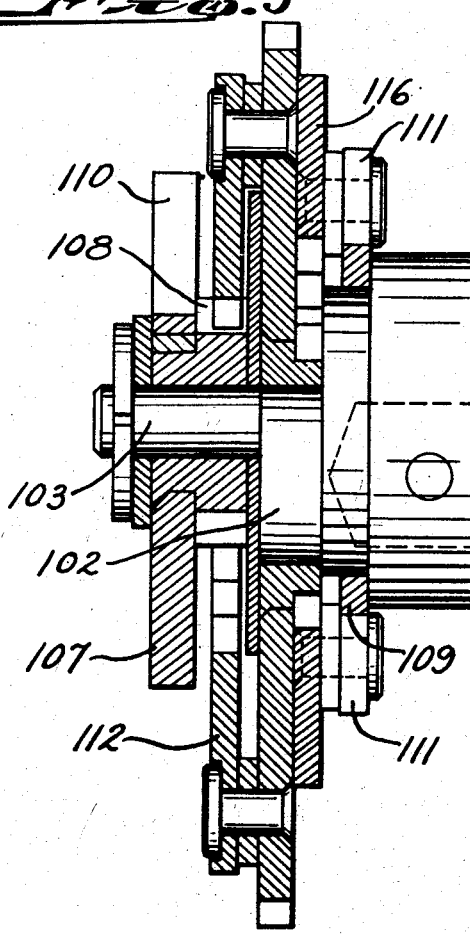
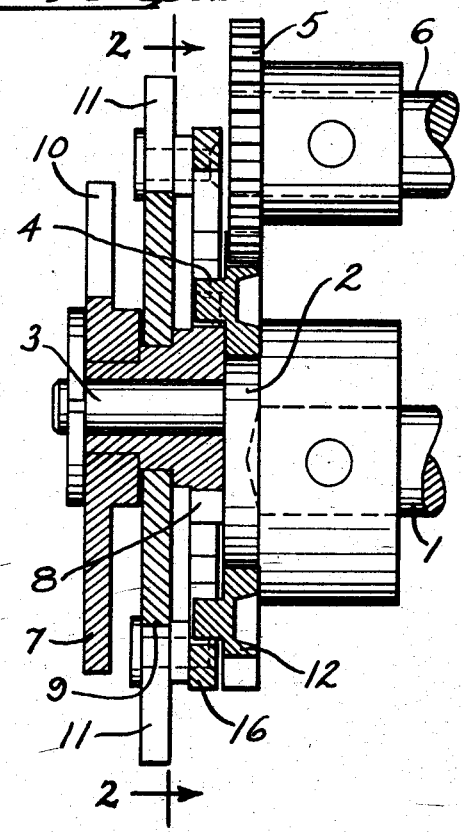
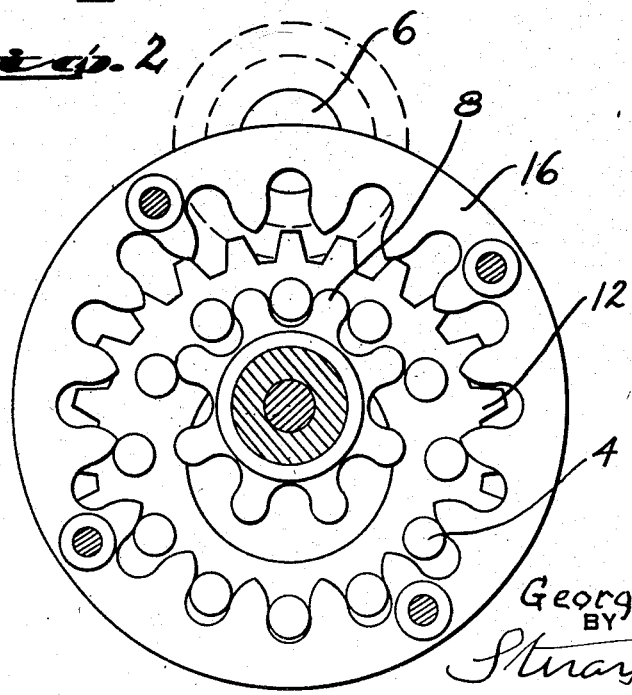
INVENTOR
George C. Chase
BY
Stuart Wilder
ATTORNEY April 2, 1935. G. C. CHASE 1,996,144
TRANSMISSION MECHANISM
Filed Jan. 17, 1934 3 Sheets-Sheet 2

INVENTOR
George C. Chase
BY Stuart Hilde
ATTORNEY

April 2, 1935.  G. C. CHASE  1,996,144
TRANSMISSION MECHANISM
Filed Jan. 17, 1934   3 Sheets-Sheet 3

INVENTOR
George C. Chase
BY
Stuart Wilder, ATTORNEY

Patented Apr. 2, 1935

1,996,144

UNITED STATES PATENT OFFICE 1,996,144

TRANSMISSION MECHANISM

George C. Chase, South Orange, N. J., assignor to Monroe Calculating Machine Company, Orange, N. J., a corporation of Delaware Application January 17, 1934, Serial No. 706,949

9 Claims. (Cl. 74—394)

The invention relates to transmission mechanism and to controls therefor, and is useful as a reverse or as a change speed gearing or as a clutch controlled variable speed transmission.

The invention consists in the novel construction and combination of parts, as set forth in the appended claims.

In the accompanying drawings illustrating the invention:

Fig. 1 is an axial section taken through a reverse gear unit embodying the invention.

Fig. 2 is a section on line 2—2 of Fig. 1.

Fig. 3 is a view similar to Fig. 1, showing a modified form of reverse gearing.

Figure 4:
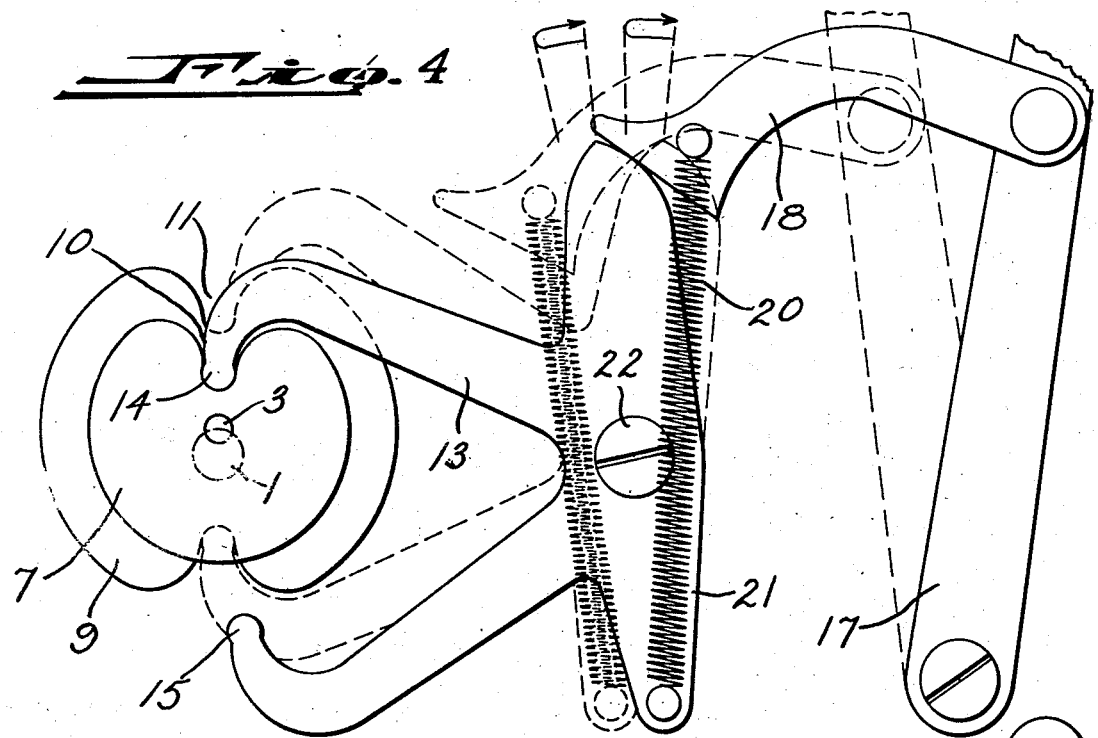
Fig. 4 is a side elevation showing a change lever and cycle lock control for the gearing illustrated in Fig. 1, the parts being shown in full cycle position.

The reversing gear herein illustrated is of the differential gear type, and more specifically of that form of differential gearing which may be termed orbital, as defined in my U. S. Patent 1,858,763, issued May 17, 1932. As stated in this patent, orbital gearing implies gearing including a member having rotary motion about its axis and also moving in an orbit. Still more specifically, the train consists of that variety of orbital gearing described as entocyclic in my U. S. Patent 1,794,514 issued March 3, 1931, and in Patent 1,828,180, issued to Clyde Gardner on October 20, 1931. The term "entocyclic" is intended to distinguish from epicyclic gearing, wherein characteristically a planet gear rolls around a sun gear, whereas in entocyclic gearing the characteristic action is the carrying of a gear in an orbit within the circumference of an internally toothed gear.

As shown in Fig. 1, the driving shaft 1 is provided with a concentric seat 2 and with an eccentric stud 3, upon which stud is mounted floating pinion 8, provided with eight gear teeth. Upon the hub of pinion 8 is mounted an internally toothed gear 16 (which may be supported, as shown in Fig. 1 upon a locking disk, hereinafter described), this gear having sixteen internal gear teeth, lying in the plane of the teeth of pinion 8. A gear member 12 is mounted upon the concentric seat 2 of shaft 1 and is provided with an annular series of projections 4 (twelve in number), these projections meshing with the teeth of pinion 8 and with the teeth of internally toothed gear 16 as clearly shown in Fig. 2. Gear member 12 is also provided with circumferential gear teeth meshing with a pinion 5 on the driven shaft 6. A locking disk 7 is rigidly secured to the pinion 8 and a locking disk 9 to the internally toothed gear 16, these disks being provided with notches 10 and 11, (Figs. 4 and 5) adapted to be engaged by a control lever as hereinafter described to hold the pinion or alternatively the internal toothed gear 16 against rotation on their own axes.

Assuming shaft 1 to be rotating and pinion 8 to be held against rotation, through engagement of its locking plate 7, a single rotation of shaft 1 in a clockwise direction as viewed in Fig. 2 will carry the center of gear 8 about the axis of said shaft, and the eight teeth of said gear, meshing with the twelve projections 4 of gear member 12 will advance said gear member clockwise a distance of four teeth. This movement may be converted into one or more cycles of movement or into a partial cycle of movement of the driven shaft 6 by providing any suitable gear ratio between the gears 12 and 5. It may be noted that during this movement gears 16 will be advanced a distance of four teeth in a clockwise direction by the rolling movement thereof about the gear 12, and that it will also be carried an additional distance of four teeth by the advancing movement of gear 12, this imparting a half rotation (idle movement) to gear 16. Because of this half rotation two diametrically spaced notches 11 are provided in locking disk 9, so that one notch will always stand in position, when the parts come to full cycle position, to be engaged by the control lever 13. Because of the engagement of locking disk 7 by control lever 13, not only is clockwise movement transmitted to driven shaft 6, but, as, the engaging tip 14 of said lever (Fig. 4) serves as a fulcrum for the movement imparted to the teeth of pinion 8, these teeth will impart a substantially harmonically accelerated and decelerated motion to gear 12 and thereby to the driven parts. This is particularly desirable in case some form of cyclically operated devices are to be driven by shaft 6, the load being picked up gradually and brought gradually to rest at the end of the cycle.

In case shaft 1 is rotating clockwise and internal toothed gear 16 is held by engagement of the control lever with one of the notches 11 of locking disk 9, the action of the sixteen teeth of gear 16 upon the twelve teeth of gear member 12 will advance said gear member counter-clockwise a distance of four teeth, carrying the shaft 6 in a reverse direction to that described above. During this movement the pinion 8 will be advanced by the rolling engagement with projections 4 a distance of four teeth in a counter-clockwise direction, and will also be advanced four teeth further by the movement of gear 12, thus making a complete revolution. The motion transmitted to shaft 6 will be substantially harmonic in this case also.

A modified form of reverse gearing is shown in Fig. 3, wherein the floating pinion 108 is offset from the internal tooth gear 116, in order that the gear member 112 may be provided with gear teeth of conventional form for engaging these two elements of the gear train. The other parts of this modified mechanism correspond to the parts illustrated in Fig. 1, and are designated by similar numerals in a series beginning with the number 101.

Figure 5:
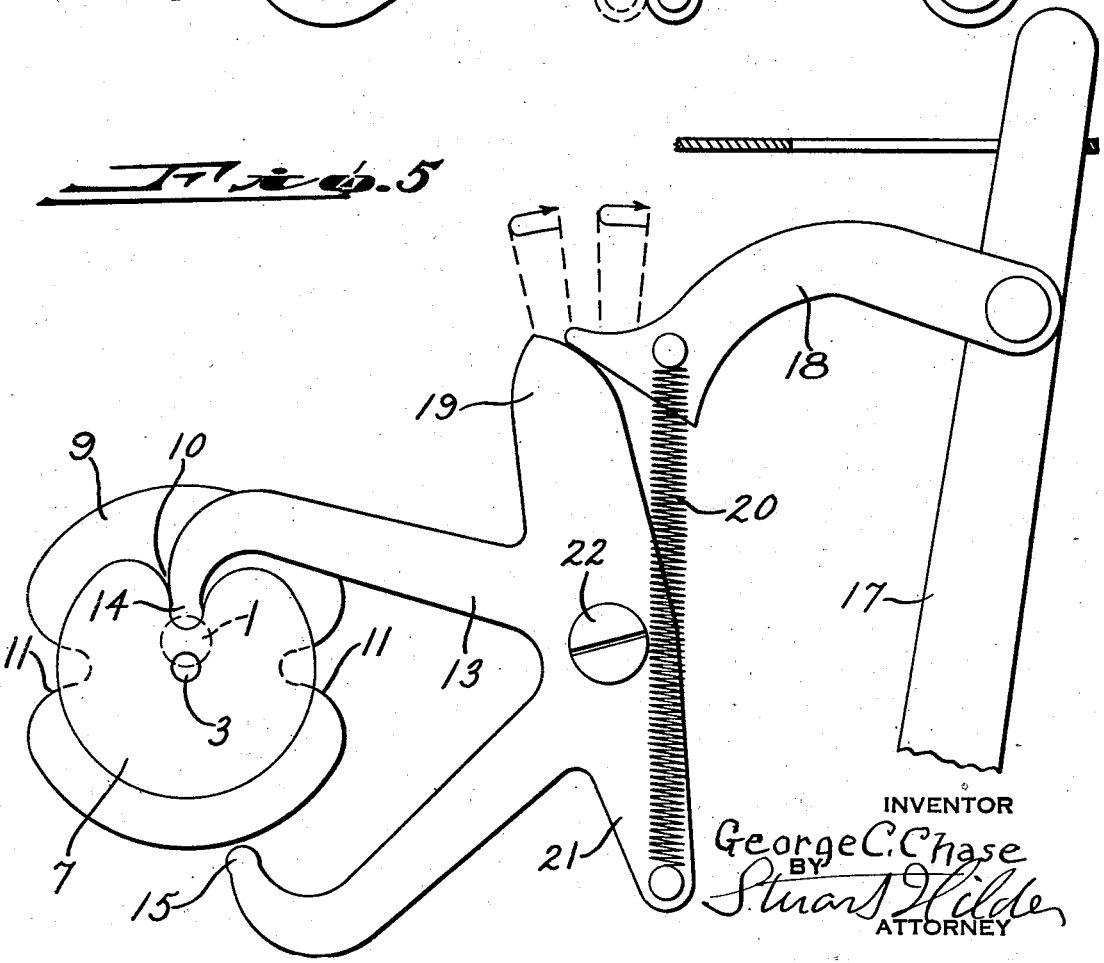
Fig. 5 is a similar view, illustrating the parts in mid-cycle position.

As seen in Fig. 4, control lever 13 is provided with two opposed tips 14 and 15, for engaging either the notch 10 of locking disk 7 or one of the notches 11 of locking disk 9. The disk which is not engaged by the control lever 13, upon rotation of the attached gear 8 or 16, will be moved to bring a peripheral portion of the disk opposite the corresponding finger of lever 13, whereby the opposite finger of the lever will be locked in engagement with the notch of its disk until the parts return to full cycle position. It may be noted that the substantially harmonic movement of gear 12, above-explained, will be transmitted harmonically, through gear 16 or pinion 8, to the rotatable locking disk 9 or 7, so that the notch 11 or 10 of said disk will move slowly through its position of engagement with the tip 15 or 14 of lever 13. Consequently, the lever may be thrown from one engaging position to the other to reverse the direction of drive, at any point within a full-cycle zone of considerable extent.

It will be noted that during the rotation of the parts the locking disks 7 and 9 will be carried around the axis of shaft 1, and lever 13 will be correspondingly rocked. In order to provide a manual shift lever 17 which will not be affected by the rocking movement of lever 13, this lever 17 is provided with a pawl 18 adapted to engage with a tooth 19 of control lever 13 and a spring 20 connects pawl 18 with an extension 21 of control lever 13. Therefore, lever 13 may be thrown from one of its active positions to another, as indicated by the full and by the dotted lines in Fig. 4, pawl 18 engaging one or the other face of the tooth 19 for this purpose, and in either of these two positions lever 13 may be oscillated without moving lever 17 and without throwing the tooth 19 to the opposite side of pawl 18. As seen in Fig. 4, the movement of pawl 18 from one position to the other, carries spring 20 across the fulcrum 22 of lever 13, whereby the spring action of the parts is improved.

This arrangement admits of throwing the hand lever 17 during any part of the cycle of operation, the locking plate 7 or the locking plate 9 serving to hold the parts in their previously adjusted position until, for instance, the end of the cycle, at which time, hand lever 17 having been thrown and the point of pawl 18 standing just beyond the tooth of lever 13, the latter lever will be thrown into its reverse position. In other words, the hand lever may be thrown at any time, and the parts will complete the current operation and will then move in response to the new setting of the hand lever. This is not only of considerable convenience where the control lever 13 is to be adjusted by hand, but is also of great value in case that it is desired to throw lever 13 automatically during the operation of the driven parts.

Figure 6:
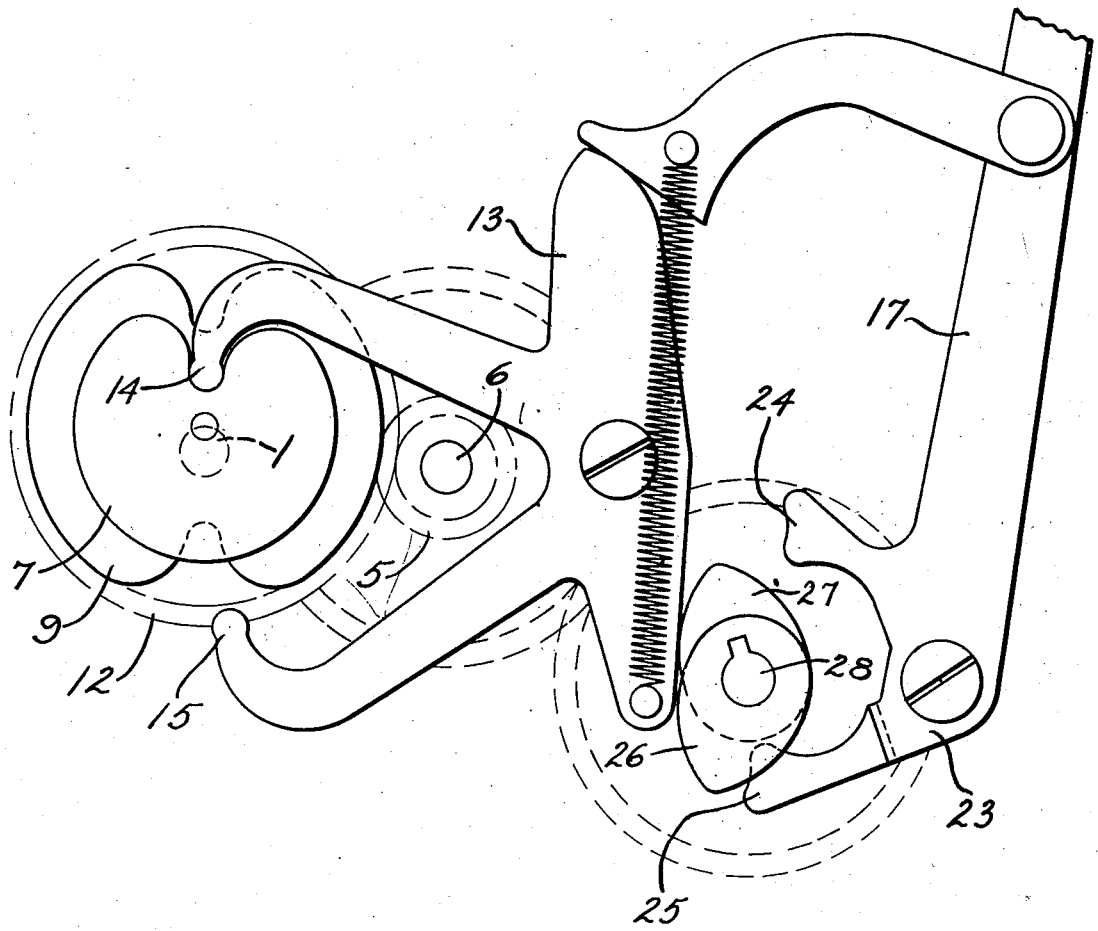
Fig. 6 is a similar view, showing the addition of an automatic return mechanism.

Means whereby the lever 17 may be automatically adjusted from one position to the other is illustrated in Fig. 6, wherein said lever is provided with a forked extension 23 provided with teeth 24 and 25, lying upon opposite sides of driven shaft 28 (said shaft being here illustrated as operated from shaft 6). Tooth members 26 and 27 are shown as slidably keyed upon shaft 6, being movable by any desired means into the planes of the teeth 24 and 25, respectively.

Assuming that the gears 12 and 5 provide for a single cycle of operation of shaft 6 for each rotation of the driving shaft 1, the tooth 26 will engage the tooth 24 of fork 23 in mid-cycle position of the parts, when the former tooth is slid into active position, while if tooth 27 is slid into active position it will likewise engage tooth 25 of fork 23 in the mid-cycle position of the parts. Engagement of tooth 26 with tooth 24 will throw lever 17 into its right hand position as viewed in Fig. 6 and therefore at the end of the cycle will engage the tip 14 of lever 13 with the plate 7. Likewise upon engagement of tooth 27 with tooth 25, lever 17 will be thrown to its left hand position, and at the end of the cycle the tip 15 of lever 13 will be thrown into engagement with plate 9. Obviously there are many mechanisms capable of exerting a controlling movement during the cycle but not adapted to exert such a control at full cycle position, and the present mechanism is well adapted to respond to such a control.

I claim:

1. Transmission mechanism including a driving member, a driven member, a train of entocyclic gearing between said members, a notched plate fixed to one element of said train, a lever adjustable to engage said notch and cooperate with the gearing to convert constant speed motion of the driving member into cyclic variable speed motion of the driven member, and a plate fixed to one element of the gearing train and operable thereby to lock the lever in adjusted position during each cycle of movement of the driven member.

2. Transmission mechanism including a shaft and a train of orbital gearing supported therefrom and comprising an internally toothed gear, a pinion, and a driven gear element provided with an annular series of lateral projections surrounding said shaft, each projection meshing with the teeth of the internally toothed gear and with the teeth of the pinion.

3. Transmission mechanism for cyclically operated devices, including a train of differential gearing, a lever adjustable into engagement with an element of said train to control the differential action thereof, and a cyclically driven locking member operable to intermittently hold the lever in adjusted position.

4. Transmission mechanism for cyclically operated devices, including a train of differential gear, a lever adjustable into engagement with an element of said train to control the differential action thereof, a cyclically driven locking member operable to intermittently hold the lever in disengaged position, a spring device adjustable to urge said lever into engaging position, and adjustment means for said device operable independently of the locking member.

5. Transmission mechanism for cyclically operated devices, including a train of differential gearing, a forked lever oppositely adjustable into engagement with one element or alternatively with another element of said train to control the differential action thereof cyclically driven locking members operable to intermittently hold the lever in the one or the other adjusted position, a spring device adjustable to urge said lever into the one or the other engaging position, and adjustment means for said device operable independently of the locking members.

6. Transmission mechanism for cyclically operated devices, including a train of differential gearing, a lever adjustable into engagement with an element of said train to control the differential action thereof, a cyclically driven locking member operable to intermittently hold the lever in disengaged position, a spring device adjustable to urge said lever into engaging position, and a cyclically driven member operable to adjust said device with the locking member in holding position.

7. Transmission mechanism including a driving shaft, a driven member, a train of intermediate entocyclic gearing supported from said shaft and including a floating gear mounted eccentrically of said shaft, a clutch plate rigidly fixed to said gear, and a clutch lever adjustable to engage said plate.

8. Transmission mechanism including a shaft, a train of entocyclic gearing supported therefrom and comprising a floating internally toothed gear mounted eccentrically of said shaft, a clutch plate rigidly fixed to said gear, a floating pinion mounted eccentrically of said shaft, a clutch plate rigidly fixed to said pinion, a driven gear element mounted concentrically with said shaft and meshing with the internally toothed gear and with the pinion, and a clutch lever adjustable to engage one of the clutch plates and further adjustable engage the other plate.

9. Transmission mechanism including a driving shaft, a driven member, a train of intermediate entocyclic gearing supported from said shaft and including a floating gear mounted eccentrically of said shaft, a radially notched plate rigidly fixed to said gear, and a spring-pressed lever adjustable to engage the notch of said plate.

GEORGE C. CHASE.